(12) United States Patent
Song

(10) Patent No.: US 8,808,884 B2
(45) Date of Patent: Aug. 19, 2014

(54) ELECTRODE ASSEMBLY AND SECONDARY BATTERY INCLUDING THE SAME

(75) Inventor: Sooan Song, Suwon-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 348 days.

(21) Appl. No.: 12/852,429

(22) Filed: Aug. 6, 2010

(65) Prior Publication Data

US 2011/0064973 A1    Mar. 17, 2011

Related U.S. Application Data

(60) Provisional application No. 61/242,956, filed on Sep. 16, 2009.

(51) Int. Cl.
*H01M 4/131* (2010.01)
*H01M 4/485* (2010.01)

(52) U.S. Cl.
USPC .......................................... 429/60; 429/231.1

(58) Field of Classification Search
None
See application file for complete search history.

(56) References Cited

U.S. PATENT DOCUMENTS

| | | | |
|---|---|---|---|
| 5,569,520 A * | 10/1996 | Bates | 429/162 |
| 6,596,432 B2 | 7/2003 | Kawakami et al. | |
| 2006/0147795 A1 | 7/2006 | Li et al. | |
| 2007/0184338 A1 | 8/2007 | Kojima et al. | |
| 2007/0196732 A1 | 8/2007 | Tatebayashi et al. | |
| 2008/0241689 A1 | 10/2008 | Takami et al. | |
| 2008/0280208 A1 | 11/2008 | Naoi et al. | |
| 2009/0029249 A1 | 1/2009 | Takami et al. | |
| 2010/0028775 A1 * | 2/2010 | Emura et al. | 429/209 |

FOREIGN PATENT DOCUMENTS

| | | |
|---|---|---|
| CN | 101026250 A | 8/2007 |
| EP | 1 826 843 A1 | 8/2007 |
| JP | 07-122276 A | 12/1995 |
| JP | 2001-210324 A | 8/2001 |
| JP | 2008-053196 | 3/2008 |
| JP | 2008-517419 A | 5/2008 |
| JP | 2008-243612 A | 10/2008 |
| JP | 2009-021134 A | 1/2009 |
| KR | 10-1995-0034974 A | 12/1995 |
| KR | 10-0243830 | 11/1999 |
| KR | 10-2008-0087718 | 10/2008 |
| WO | WO 2008/065900 | * 6/2008 |

OTHER PUBLICATIONS

European Search Report issued by European Patent Office on Nov. 22, 2010.

(Continued)

*Primary Examiner* — Jonathan Crepeau
(74) *Attorney, Agent, or Firm* — Robert E. Bushnell, Esq.

(57) ABSTRACT

Provided are an electrode assembly and a secondary battery including the same. The electrode assembly includes a positive electrode having a positive electrode coating portion, a negative electrode having a negative electrode coating portion, and a separator disposed between the positive electrode and the negative electrode. The negative electrode coating portion includes lithium titanate oxide (LTO). An area of the positive electrode coating portion is larger than that of the negative electrode coating portion. Accordingly, all materials in the LTO contained in the negative electrode coating portion participate in charge/discharge operations, so that generation of gas due to an additional reaction occurring between LTO and electrolyte may be suppressed, thereby effectively preventing the secondary battery from swelling.

7 Claims, 5 Drawing Sheets

(56) References Cited

OTHER PUBLICATIONS

Japanese Office Action dated Dec. 4, 2012 in connection with Japanese Patent Application No. 2010-206575 and Request for Entry of the Accompanying Office Action attached herewith.
Chinese Office Action dated Jan. 10, 2013 issued by SIPO in connection with 201010286356.8 and also which claims US. Appl. No. 61/242,956 with Request for Entry of the Accompanying Office Action.
Chinese Office Action dated Jun. 27, 2013, in corresponding Chinese Patent Application No. 201010286356.8, which claims priority from the present application, and Request for Entry of the Accompanying Office Action attached herewith.

* cited by examiner

ELECTRODE ASSEMBLY AND SECONDARY BATTERY INCLUDING THE SAME

CLAIM OF PRIORITY

This application makes reference to, incorporates the same herein, and claims all benefits accruing under 35 U.S.C. §119 from a provisional application earlier filed in the U.S. Patent & Trademark Office on 16 Sep. 2009 and there duly assigned Ser. No. 61/242,956.

BACKGROUND OF THE INVENTION

1. Field of the Invention

Aspects of the present invention relate to an electrode assembly and a secondary battery including the same.

2. Description of the Related Art

Recently, the use of portable electronic devices has increased with the rapid development of communication and computer industries. Rechargeable secondary batteries are widely used as power sources of portable electronic devices. A secondary battery generally includes an electrode assembly including a positive electrode, a negative electrode, and a separator disposed between the positive electrode and the negative electrode and insulating the positive electrode and the negative electrode from each other.

One of important considerations in the secondary battery is to control occurrence of swelling during storage at a high temperature. In particular, when lithium titanate oxide (LTO) is contained as a negative electrode active material, an extent of swelling in a discharged state (0% state of charge (SOC)) is greater than that in a charged state (100% SOC). Sealing of the secondary battery may be broken due to the swelling, resulting in leakage of electrolyte or infiltration of moisture, thereby ultimately degrading the battery performance. Accordingly, the control of swelling of the secondary battery is an important issue to be considered.

SUMMARY OF THE INVENTION

Aspects of the present invention provide an electrode assembly, which can prevent a secondary battery including the electrode assembly from swelling, and which exhibits an excellent swelling prevention effect even containing lithium titanate oxide (LTO) as a negative electrode active material.

Aspects of the present invention also provide a secondary battery having an excellent swelling prevention effect.

According to one or more embodiments of the present invention, there is provided an electrode assembly including a first electrode, a second electrode, and a separator disposed between the first electrode and the second electrode. The first electrode includes a first electrode collector and a first electrode coating portion formed on at least one surface of the first electrode collector. The second electrode includes a second electrode collector and a second electrode coating portion formed on at least one surface of the second electrode collector. The second electrode coating portion faces the first electrode coating portion. An area of the first electrode coating portion is larger than an area of the second electrode coating portion. The second electrode coating portion includes lithium titanate oxide.

An area of the first electrode collector may be larger than an area of the second electrode collector. An area of the second electrode collector may be larger than an area of the first electrode collector. An area of the first electrode collector may be substantially the same as an area of the second electrode collector.

The first electrode may be a positive electrode and the second electrode may be a negative electrode.

A ratio of the area of the first electrode coating portion to the area of the second electrode coating portion may be between about 1.01 and about 1.21. The ratio of the area of the first electrode coating portion to the area of the second electrode coating portion may be between about 1.01 and about 1.10.

The first electrode coating portion may cover the second electrode coating portion.

A ratio of a capacity of the first electrode coating portion to a capacity of the second electrode coating portion may be between about 1.0 and about 1.5. The ratio of the capacity of the first electrode coating portion to the capacity of the second electrode coating portion may be between about 1.0 and about 1.3.

The first electrode coating portion may be formed on a surface of the first electrode collector facing the second electrode coating portion and on an opposite surface of the first electrode collector. The second electrode coating portion may be formed on a surface of the second electrode collector facing the first electrode coating portion and on an opposite surface of the second electrode collector.

The first electrode coating portion may be formed only on a surface of the first electrode collector facing the second electrode coating portion. The second electrode coating portion may be formed only on a surface of the second electrode collector facing the first second electrode coating portion.

According to another aspect of the present invention, there is provided a secondary battery including an electrode assembly, a case accommodating the electrode assembly, a protection circuit board, and an electrolyte filled in the case. The electrode assembly includes a first electrode, a second electrode, and a separator disposed between the first electrode and the second electrode. The first electrode includes a first electrode collector and a first electrode coating portion formed on at least one surface of the first electrode collector. The second electrode includes a second electrode collector and a second electrode coating portion formed on at least one surface of the second electrode collector. The second electrode coating portion faces the first electrode coating portion. An area of the first electrode coating portion is larger than an area of the second electrode coating portion. The second electrode coating portion includes lithium titanate oxide. The protection circuit board is coupled to the first and second electrodes of the electrode assembly.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
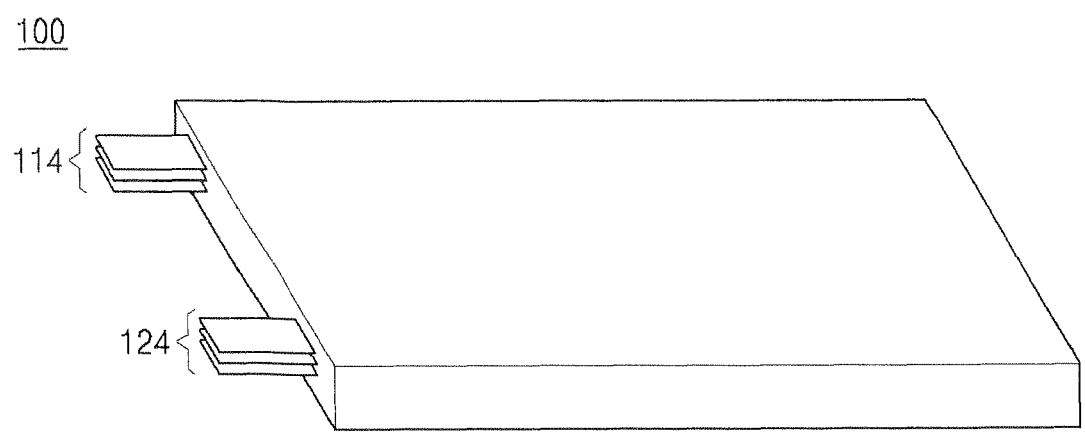
FIG. 1 is a perspective view of an electrode assembly according to an embodiment of the present invention.

Example embodiments will now be described more fully hereinafter with reference to the accompanying drawings. Examples are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
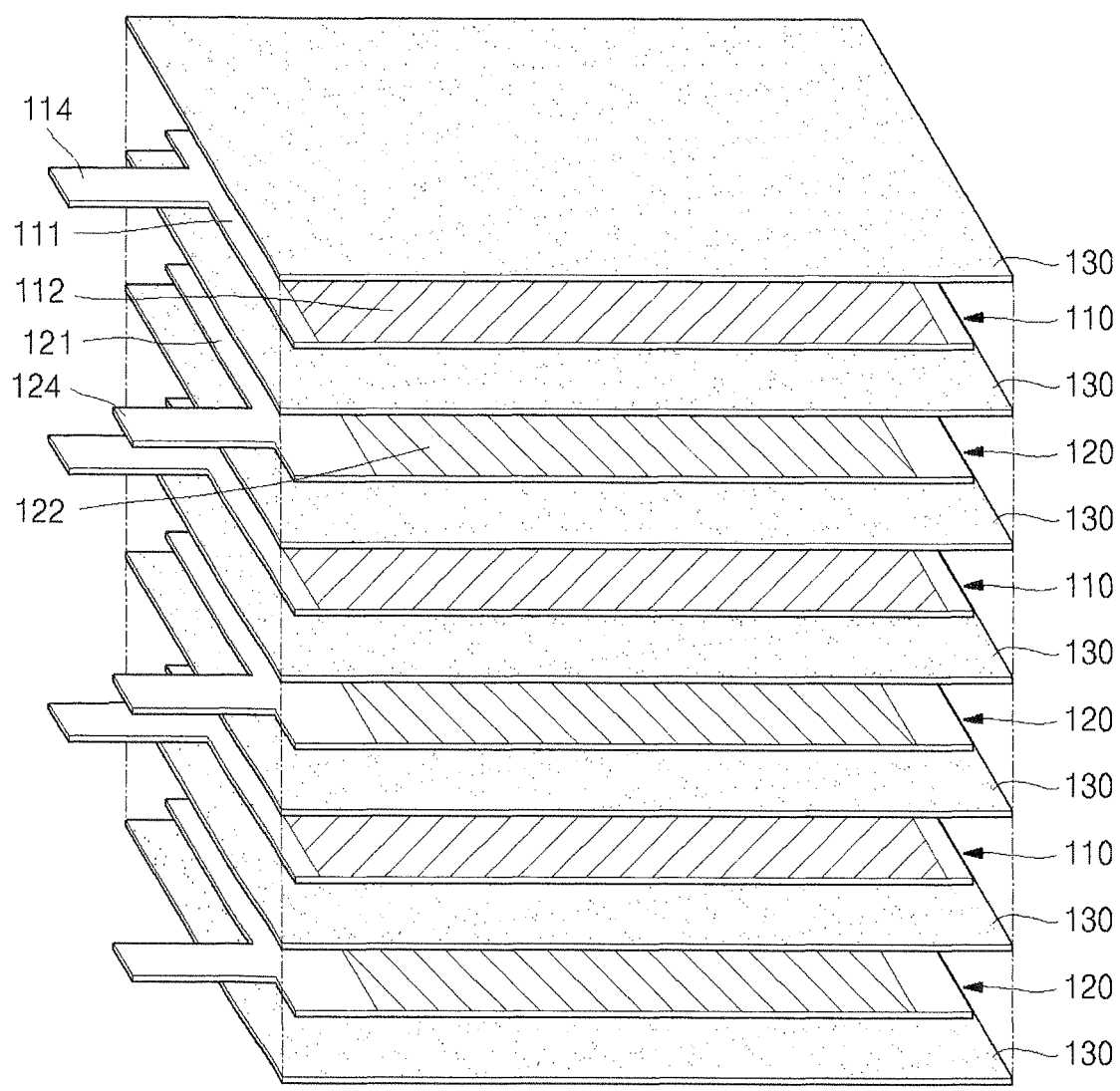
FIG. 2 is an exploded perspective view of the electrode assembly shown in FIG. 1.
Figure 3:
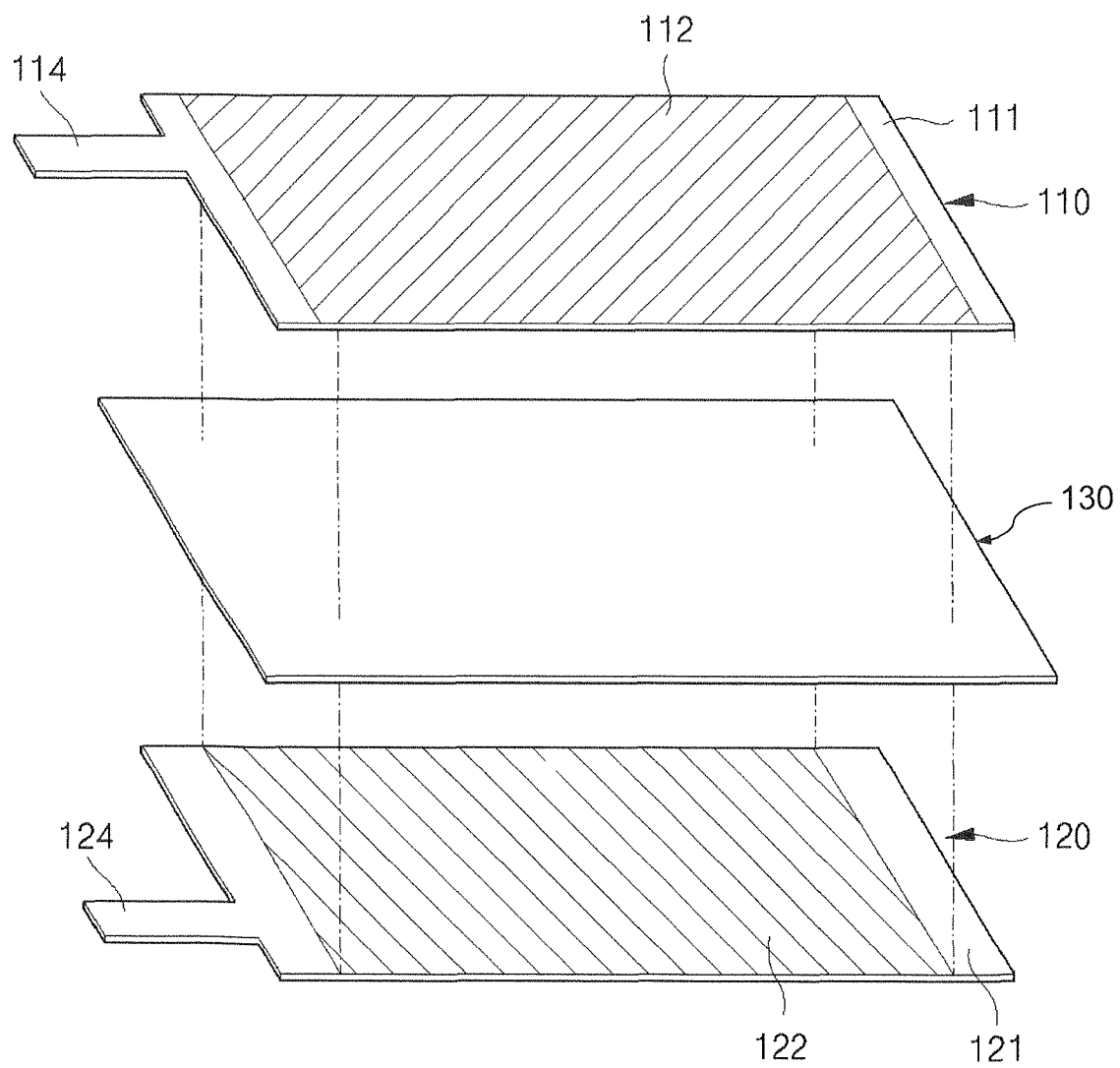
FIG. 3 is a partially cutaway perspective view of the electrode assembly shown in FIG. 1.

FIG. 1 is a perspective view of an electrode assembly according to an embodiment of the present invention, FIG. 2 is an exploded perspective view of the electrode assembly shown in FIG. 1, and FIG. 3 is a partially cutaway perspective view of the electrode assembly shown in FIG. 1.

Referring to FIGS. 1 to 3, the electrode assembly 100 includes a positive electrode 110, a negative electrode 120 and a separator 130 disposed between the positive electrode 110 and the negative electrode 120.

The positive electrode 110 includes a positive electrode collector 111, a positive electrode coating portion 112 formed on at least one surface of the positive electrode collector 111, and a positive electrode tab 114. The positive electrode collector 111 generally has a thickness of from about 10 to about 500 μm.

Non-limiting examples of the positive electrode collector 111 may include an electron conductive material which is highly conductive while not causing a chemical change to a battery. For example, stainless steel, aluminum, nickel, titanium, graphite carbon, or a material in which carbon, nickel, titanium or silver is applied by surface-treating on either aluminum or stainless steel.

In order to increase adhesiveness of the positive electrode active material, unevenness can also be formed on the surface of the positive electrode collector 111. The shape of the positive electrode collector 111 is not particularly limited. For example, the positive electrode collector 111 can be used in the shape of a film, a sheet, a foil, a net, a porous material, a foam, a non-woven material, or the like.

The positive electrode coating portion 112 is formed on at least one surface of the positive electrode collector 111, and may be formed by coating a general positive electrode coating composition on the positive electrode collector 111. The positive electrode coating composition includes a positive electrode active material, and may include a conductive agent and a binder. The positive electrode coating portion 112 may be formed on one surface of the positive electrode collector 111, but in view of battery performance, the positive electrode coating portion 112 may be formed on both surfaces of the positive electrode collector 111.

Examples of the positive active materials may include materials generally used for a positive electrode of a secondary battery, for example, $LiCoO_2$, which demonstrates stable charge/discharge characteristic, excellent electron conductivity, high stability and an even discharge voltage profile, and so on. In addition, $Li[Ni_xCo_{1-x-y}Mn_y]O_2$ ($0<x<0.5$ and $0<y<0.5$), which is generally used for a positive electrode of a secondary battery, may also be used as the positive electrode active material.

Non-limiting examples of the conductive agent may include an electron conductive material which is chemically stable in a battery. For example, it is possible to use carbon blacks such as acetylene black, ketchen black, channel black, furnace black, lamp black, and thermal black; conductive fibers such as carbon fiber and metal fiber; metal powders such as aluminum and nickel powder; conductive whiskers such as zinc oxide and potassium titanate; conductive metal oxides such as titanate; organic conductive materials such as polyphenylene derivative; and carbon fluoride. The conductive agent may be used in an amount in a range that is acceptably used in the related art, and is particularly 1 to 10 weight percent, based on the positive active material composition.

To improve a binding strength in the positive electrode coating portion 112, the binder is used in an amount in a range that is acceptably used in the related art. Non-limiting examples of the binder may include polyvinyl alcohol (PVA), carboxymethyl cellulose, hydroxypropylene cellulose, diacetylene cellulose, polyvinyl chloride, polyvinyl pyrrolidone (PVP), polytetrafluoroethylene (PTFE), polyvinylidene fluoride (PVDF), polyethylene, and polypropylene.

In addition to the positive electrode active material, the conductive agent and the binder, an additive, which is generally used for a positive electrode active material coating composition, may be further added to the positive electrode active material coating composition, if necessary.

The positive electrode tab 114 is formed at one side of the positive electrode collector 111, and is electrically connected to a protective circuit module through a separate positive electrode lead terminal, which will later be described.

Meanwhile, the negative electrode 120 includes a negative electrode collector 121, a negative electrode coating portion 122 formed on the negative electrode collector 121 and a negative electrode tab 124. The negative electrode collector 121 generally has a thickness of from about 10 to about 500 μm.

Non-limiting examples of the negative electrode collector 121 may include an electron conductive material which is highly conductive while not causing a chemical change to a battery. For example, stainless steel, aluminum, nickel, titanium, graphite carbon, or a material in which carbon, nickel, titanium or silver is applied by surface-treating on either aluminum or stainless steel.

Like in the positive electrode collector 111, in order to increase adhesiveness of the negative electrode active material, unevenness can also be formed on the surface of the negative electrode active material. Unevenness may also be formed on the surface of the negative electrode collector 121. The shape of the negative electrode collector 121 is not particularly limited. For example, the negative electrode collector 121 can be used in the shape of a film, a sheet, a foil, a net, a porous material, a foam, a non-woven material, or the like.

The negative electrode coating portion 122 is formed on at least one surface of the negative electrode collector 121, and may be formed by coating a general negative electrode coating composition on the negative electrode collector 121. The negative electrode coating composition includes a negative electrode active material, and may include a conductive agent and a binder. The negative electrode coating portion 122 may be formed on one surface of the negative electrode collector 121, but in view of battery performance, the negative electrode coating portion 212 may be formed on both surfaces of the negative electrode collector 121.

The negative electrode active material may include lithium titanate oxide (LTO).

As the conductive agent and the binder, materials that are generally used in the related art may be used. For example, the same conductive agent and binder as those for the positive active material composition may be used.

The negative electrode active material, the conductive agent and the binder may be mixed in various mixing ratios in a general range of use. In addition to the negative electrode active material, an additive, which is generally used for a positive electrode active material coating composition, may be further added to the negative electrode active material coating composition, if necessary.

The negative electrode tab 124 is formed at one side of the negative electrode collector 121, and is electrically connected to a protective circuit module through a separate negative electrode lead terminal.

The separator 130 is disposed between the positive electrode 110 and the negative electrode 120 to insulate the positive electrode 110 from the negative electrode 120. The separator 130 may include at least one material such as polyethylene, polypropylene, polyvinylidene fluoride, polyethylene oxide, polyacrylonitrile and polyvinylidene fluoride hexafluoropropylene.

Here, the separator 130 may be formed not only between the positive electrode 110 and the negative electrode 120 but also outside the outermost positive electrode 110 or/and outside the outermost negative electrode 120 of the electrode assembly 100 to insulate the electrode assembly 100 from a case accommodating the electrode assembly 100.

As is generally known, a battery using graphite as a negative electrode active material may undergo a greater extent of swelling when the battery is charged to 100% state of charge (SOC) than when charged to 0% SOC. Under the circumstances, various attempts to reduce the extent of swelling have been proposed. In the proposed methods, lithium titanate oxide (LTO) was as a negative electrode active material. Among the proposed methods, however, there has been a method, in which an extent of swelling was greater in a battery charged to 0% SOC than in a battery charged to 100% SOC. In order to control the extent of swelling in a case of using LTO as the negative electrode active material, in the embodiment of the present invention, an area of the positive electrode coating portion 112 is made greater than that of the negative electrode coating portion 122. A surface of the positive electrode coating portion 112 faces a surface of the negative electrode coating portion 122, while the separator 130 is disposed between the surfaces of the positive and negative electrode coating portions 112 and 122. Herein, the areas of the positive and negative coating portions 112 and 122 means areas of the surfaces of the positive and negative coating portions 112 and 122 that face each other. The positive and negative electrodes may be referred to as a first and second electrodes, respectively, or vice versa.

Charge/discharge operations of LTO may be expressed as follows:

$$Li_4Ti_5O_{12} + 3Li^+ \Leftrightarrow Li_7Ti_5O_{12} \qquad \text{Reaction Scheme 1}$$

As expressed in the Reaction Scheme 1, LTO exists in a $Li_4Ti_5O_{12}$ phase having a spinel structure in a discharged state. If the battery is designed such that an area of the negative electrode coating portion 122 is made greater than that of the positive electrode coating portion 112, the materials of the LTO, which have not participated in charge/discharge operations, may remain in a $Li_4Ti_5O_{12}$ phase in the negative electrode coating portion. In such a case, the remaining LTO of the negative electrode has lithium ions, so that an additional reaction continuously occurs between the lithium ions come from the remaining LTO and additive and electrolyte, and then generate gas, thereby aggravating swelling. Conversely, if the battery is designed such that an area of the negative electrode coating portion 122 is made smaller than that of the positive electrode coating portion 112, all the materials of the LTO contained in the negative electrode coating portion 122 may participate in charge/discharge operations. That is to say, all materials of the LTO reacts with the additive and the electrolyte to form a film on a surface of the negative electrode, thereby suppressing generation of gas due to an additional reaction between LTO and electrolyte, thereby preventing swelling.

Here, an area ratio of the positive electrode coating portion 112 to the negative electrode coating portion 122 may be in a range from about 1.01 and about 1.21, and particularly, in a range from about 1.01 and about 1.1. When the area ratio of the positive electrode coating portion 112 to the negative electrode coating portion 122 is greater than 1.21, the battery capacity may be reduced. When the area ratio of the positive electrode coating portion 112 to the negative electrode coating portion 122 is smaller than 1.01, the swelling prevention effect may be reduced.

The positive electrode coating portion 112 or the negative electrode coating portion 122 may be easily formed by coating a positive electrode active material coating composition or a negative electrode active material coating composition using a coating device, which is generally used in the related art, for example, a doctor blade, in an area ratio within the range stated above. For example, the area ratio of the negative electrode coating portion 122 to the positive electrode coating portion 112 may be adjusted by widths of non-coating portions formed on the collectors, as illustrated in FIG. 2.

The separator 130 is disposed between the positive electrode 110 and the negative electrode 120. Here, the positive electrode coating portion 112 provided in the positive electrode 110 and the negative electrode coating portion 121 provided in the negative electrode 120 are repeatedly stacked to be opposite to and face each other with the separator 130 interposed therebetween, as shown in FIG. 3. To achieve the maximum effect of preventing swelling, the positive electrode coating portion 112 and the negative electrode coating portion 122 are preferably disposed to face each other such that an overall area of the negative electrode coating portion 122 is covered in an area of the positive electrode coating portion 112. In this case, all materials of LTO contained in the negative electrode coating portion participate in charge/discharge operations, thereby effectively preventing the secondary battery from swelling.

In an embodiment, the ratio of a capacity of the negative electrode coating portion 122 to that of the positive electrode coating portion 112 may be in a range from about 1.0 to about 1.5, and particularly, in a range from about 1.0 to about 1.3. In obtaining the capacity ratio, only capacities of the positive and negative electrode coating portions participating in charge/discharge operations are taken into consideration. When the capacity ratio is in a range from about 1.0 to about 1.5, the swelling prevention effect is maximized. Here, the term "capacity" used herein means only a reversible capacity, excluding an irreversible capacity of a battery when the battery is discharged with a 1C-rate. Charge or discharge current is usually expressed (in amperes) as a multiples of the ratio capacity, called the C-rate. When the capacity ratio exceeds the range stated above, that is, when the capacity is smaller than 1.0 or greater than 1.5, the overall capacity of the battery may be disadvantageously lowered.

According to an embodiment of the present invention, the electrode assembly 100 may be a stack type in which the positive electrode 110 and the negative electrode 120 are repeatedly stacked with the separator 130 interposed therebetween.

Figure 4:
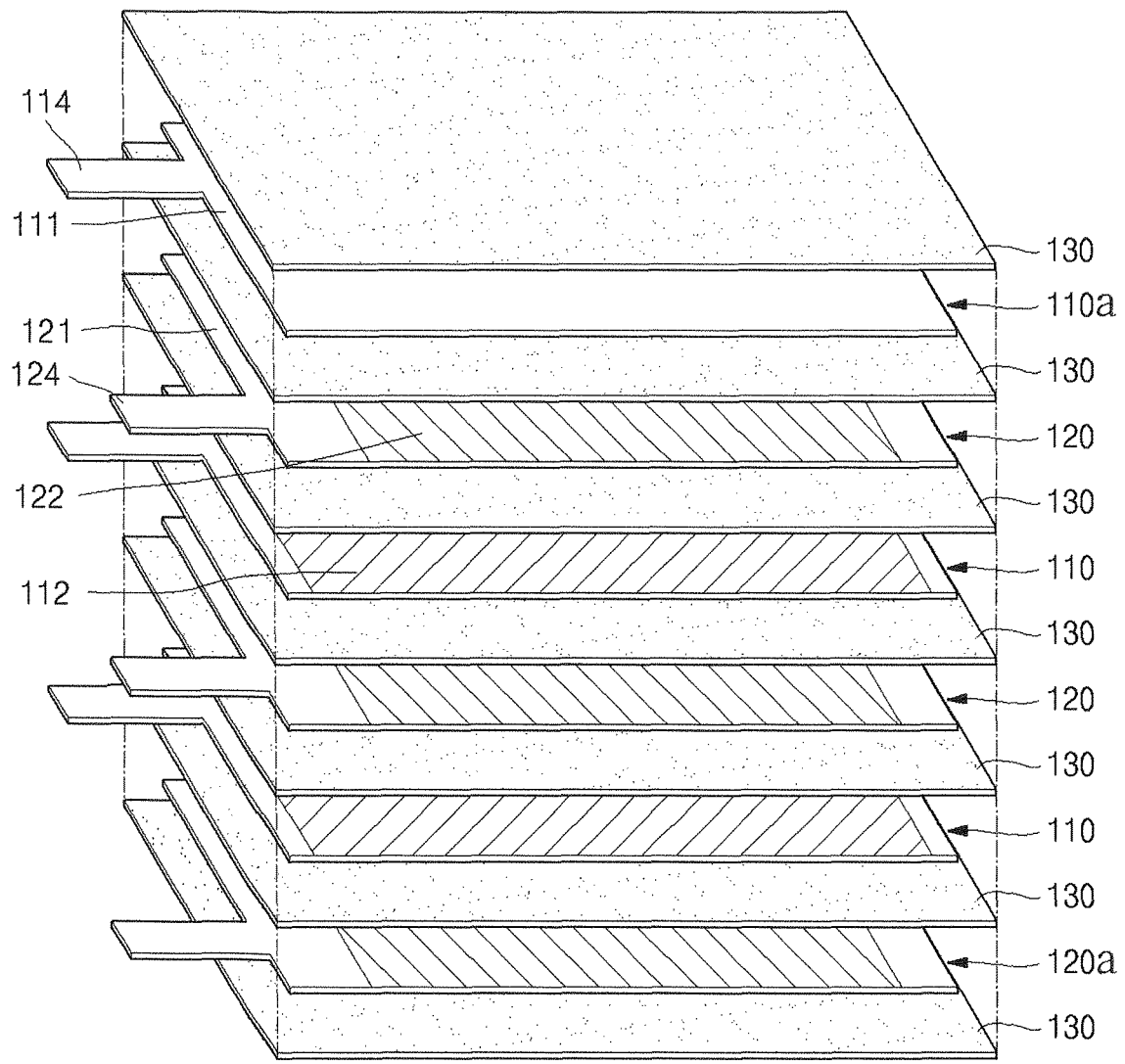
FIG. 4 is an exploded perspective view of an electrode assembly according to another embodiment of the present invention.

FIG. 4 is an exploded perspective view of an electrode assembly according to another embodiment of the present invention. Referring to FIG. 4, the electrode assembly 100 includes positive electrodes 110 and 110*a*, negative electrodes 120 and 120*b* and a separator 130.

The positive electrode 110 includes a positive electrode collector 111, a positive electrode coating portion 112 formed on at least one surface of the positive electrode collector 111, and a positive electrode tab 114. The positive electrode collector 111 generally has a thickness of from about 10 to about 500 μm.

Like the electrode assembly 100 of the previous embodiment shown in FIGS. 1 to 3, the electrode assembly 100 includes the positive electrode 110, the negative electrode 120, and the separator 130, which are repeatedly stacked. That is, the stack-type electrode assembly 100 of the present embodiment has substantially the same configuration as that of the previous embodiment, and a detailed explanation will not be given. However, the electrode assembly 100 of the present embodiment is distinguished from the electrode assembly 100 of the previous embodiment in view of the outermost positive electrode 110a and the outermost negative electrode 120a, and a detailed explanation will now be made mainly with the difference.

In the electrode assembly 100, each of the outermost positive electrode 110a and the outermost negative electrode 120a has a coating portion only on its interior surface (i.e., a bottom surface of the outermost positive electrode 110a and a top surface of the outermost negative electrode 120a in FIG. 4), and each of the other interior positive and negative electrodes 110 and 120 has their coating portions on both surfaces thereof (i.e., top and bottom surfaces of each of the interior positive electrodes 110 and the interior negative electrodes 120 in FIG. 4). If a negative electrode coating portion 122 is formed on both surfaces of each of the outermost positive electrode 110a and the outermost negative electrode 120a, LTO contained in the outermost negative electrode coating portion 122 may not participate in charge/discharge operations, so that swelling cannot be effectively controlled. However, when the negative electrode coating portion 122 is formed only on the interior surface of the outermost negative electrode 120a, all materials of LTO contained in the negative electrode coating portion participate in charge/discharge operations, thereby maximizing the swelling prevention effect.

Figure 5:
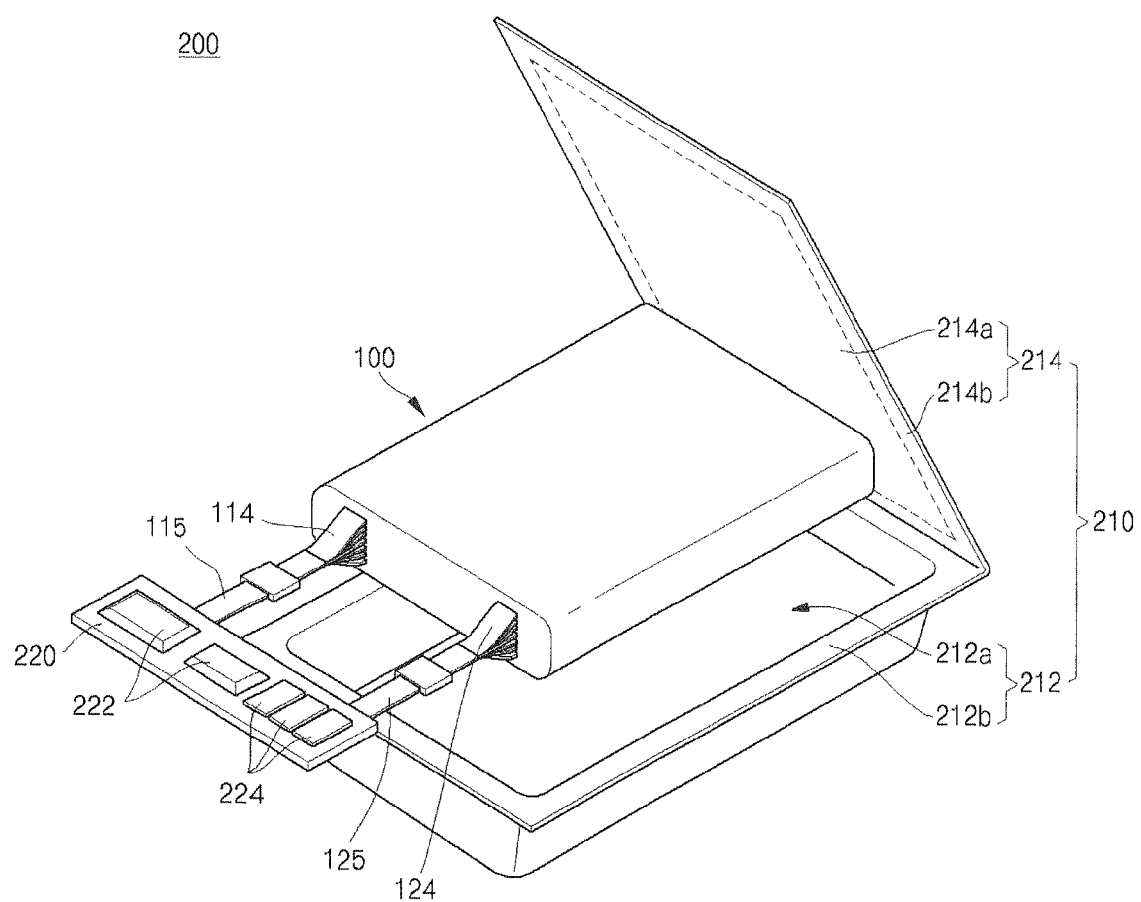
FIG. 5 is a perspective view of a secondary battery including an electrode assembly according to an embodiment of the present assembly.

FIG. 5 is a perspective view of a secondary battery including an electrode assembly according to an embodiment of the present assembly. Referring to FIG. 5, the secondary battery includes an electrode assembly 100, a case 210 accommodating the electrode assembly 100, a protective circuit module 220 electrically connected to the electrode assembly 100 through lead terminals 115 and 125, and an electrolyte. Here, the secondary battery 200 is a pouch type.

The electrode assembly 100 includes a positive electrode having a positive electrode coating portion on at least one surface thereof, a negative electrode having a positive electrode coating portion on containing lithium titanate oxide (LTO) at least one surface thereof, and a separator disposed between the positive electrode and the negative electrode. The positive electrode coating portion has a larger area than that of the negative electrode coating portion. Since the aforementioned electrode assembly 100 is substantially the same as that of the previous embodiment, a detailed explanation thereof will not be given.

The case 210 includes a main body 212 and a cover 214. The main body 212 includes a housing part 212a providing a space for accommodating the electrode assembly 100, and a sealing part 212b extending from an entrance of the housing part 212a. The cover 214 may extend from a predetermined edge of the sealing part 212b of the main body 212. The cover 214 covers the housing part 212a of the main body 212 to then be sealed with the sealing part 212b of the main body 212, providing a cover area 214a corresponding to the housing part 212a of the main body 212 and a seal area 214b corresponding to the sealing part 212b of the main body 212.

Accordingly, the secondary battery 200 is constructed such that the electrode assembly 100 is accommodated in the housing part 212a, and the sealing part 212b of the main body 212 and the seal area 214b of the cover 214 are sealed with each other by, for example, thermal fusion.

The protective circuit module 220 is electrically connected to the electrode assembly 100 through lead terminals 115 and 125. The electrode assembly 100 through lead terminals 115 and 125 are electrically connected to the positive electrode tab 114 and the negative electrode tab 124

The protective circuit module 220 includes control devices 222 controlling the secondary battery 100. Specifically, the protective circuit module 220 control charge/discharge operations of the secondary battery 100. The protective circuit module 220 includes external terminals 224 connecting the secondary battery 100 to external devices.

When the sealing of the main body 212 is completed, the electrolyte is injected into the main body 212. For the electrolyte, any nonaqueous electrolyte that is generally used in the related art may be used as long as it includes an organic solvent and a lithium salt dissolved in the organic solvent dissolving a lithium salt therein is preferably used, but the invention is not limited thereto.

Hereinafter, exemplary embodiments will be described in detail to provide clear and complete understanding of the present invention. The following embodiments of the present invention are only illustrative and the scope of the present invention is not limited to the embodiments.

Examples 1-4 and Comparative Examples 1-2

Preparation of Positive Electrode

A positive electrode active material coating composition was prepared using $LiCoO_2$ as a positive active material, polyvinylidene fluoride (PVDF) as a binder, and carbon black as a conductive agent. Here, the prepared positive electrode active material coating composition contained the positive active material, the binder, and the conductive agent mixed in a ratio of 94:3:3. The active material coating composition was dispersed in N-methyl-2-pyrrolidon using a planetary despa mixer to give a slurry, and the slurry was coated on a 20 μm thick aluminum (Al) foil using a doctor blade and dried. Table 1 summarizes slurry coating areas in various Examples and Comparative Examples. Next, pressing was performed using a roll press, followed by removing moisture from the respective coatings, thereby preparing a positive electrode.

Preparation of Negative Electrode

A negative electrode active material coating composition was prepared using LiCoO2 as LTO, PVDF as a binder, and carbon black as a conductive agent. The negative electrode was prepared in substantially the same manner as the positive electrode, except that a slurry prepared from the negative electrode active material coating composition was coated on a 15 μm thick copper (Cu) foil. Table 1 summarizes slurry coating areas in various Examples and Comparative Examples.

Manufacture of Secondary Battery

A pouch-type secondary battery having a bi-cell electrode structure was manufactured. 2.7 g of a mixed organic solvent was used as an electrolyte, the mixed organic solvent prepared by dissolving 1.1 M $LiPF_6$ in ethylene carbonate (EC)/ethylmethyl carbonate (EMC) mixed in a ratio of 30:70 by volume) without using an additive.

Experimental Example

The manufactured secondary batteries were left at 60° C. and thicknesses thereof were measured after 10 days and compared with initial thicknesses of the batteries prior to high-temperature storage. The results are shown in Table 1.

TABLE 1

|  | Area of positive electrode coating portion | Area of negative electrode coating portion | Area Ratio (Positive electrode coating portion/Negative electrode coating portion) | Capacity Ratio (Negative electrode coating portion/Positive electrode coating portion) | Percentage of swelling thickness increment (%) |
|---|---|---|---|---|---|
| Exam 1 | 65.42 | 62.64 | 1.04 | 1.2~1.3 | 14 |
| Exam 2 | 137.5 | 120 | 1.15 | 1.3~1.5 | 25 |
| Exam 3 | 210.08 | 194 | 1.09 | 1.0~1.15 | 12 |
| Exam 4 | 195.8 | 186.18 | 1.05 | 1.0~1.15 | 2 |
| Comp. Exam 1 | 62.61 | 65.42 | 0.96 | 1.2~1.4 | 57 |
| Comp. Exam 2 | 120 | 137.5 | 0.87 | 1.3~1.5 | 50 |

As confirmed from Table 1, according to Examples 1 to 4, in which an area of the negative electrode coating portion is smaller than that of the positive electrode coating portion, the batteries demonstrate a better swelling prevention effect than those prepared in Comparative Examples 1 and 2. Further, in Examples 1 to 4, when the capacity ratio of a negative electrode coating portion to a positive electrode coating portion was smallest, the swelling prevention effect was the highest.

In the electrode assembly of these embodiments, since the positive electrode coating portion has a larger area than the negative electrode coating portion, all materials of the lithium titanate oxide (LTO) contained in the negative electrode coating portion participate in charge/discharge operations. That is to say, all materials of the LTO may react with an additive and electrolyte. As a result of the reaction, a coating film, called a solid electrolyte interface (SEI) film, is formed on the surface of the negative electrode. Thus, generation of gas due to an additional reaction occurring between LTO and electrolyte may be suppressed, thereby effectively preventing the secondary battery from swelling.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
an electrode assembly comprising:
a first electrode comprising a first electrode collector and a first electrode coating portion formed on at least one surface of the first electrode collector;
a second electrode comprising a second electrode collector and a second electrode coating portion formed on at least one surface of the second electrode collector, the second electrode coating portion facing the first electrode coating portion, an area of the first electrode coating portion being larger than an area of the second electrode coating portion, the second electrode coating portion including lithium titanate oxide; and
a separator disposed between the first electrode and the second electrode;
a case accommodating the electrode assembly;
a protection circuit board coupled to the first and second electrodes of the electrode assembly; and
an electrolyte filled in the case, wherein a ratio of a capacity of the second electrode coating portion to a capacity of the first electrode coating portion is no less than 1.2 and no greater than 1.5.

2. The secondary battery of claim 1, wherein an area of the first electrode collector is larger than an area of the second electrode collector.

3. The secondary battery of claim 1, wherein an area of the second electrode collector is larger than an area of the first electrode collector.

4. The secondary battery of claim 1, wherein an area of the first electrode collector is substantially the same as an area of the second electrode collector.

5. The secondary battery of claim 1, wherein the first electrode is a positive electrode and the second electrode is a negative electrode.

6. The secondary battery of claim 1, wherein a ratio of the area of the first electrode coating portion to the area of the second electrode coating portion is between about 1.01 and about 1.21.

7. The secondary battery of claim 1, wherein the first electrode coating portion covers the second electrode coating portion.

* * * * *